United States Patent
Yamada et al.

(10) Patent No.: US 7,701,821 B2
(45) Date of Patent: Apr. 20, 2010

(54) OPTICAL DISK RECORDING/REPRODUCING APPARATUS AND TEST WRITING METHOD THEREOF

(75) Inventors: Atsushi Yamada, Saitama (JP); Koichiro Nishimura, Yokohama (JP)

(73) Assignees: Hitachi, Ltd., Tokyo (JP); Hitachi-LG Data Storage, Inc., Tokyo (JP)

( * ) Notice: Subject to any disclaimer, the term of this patent is extended or adjusted under 35 U.S.C. 154(b) by 731 days.

(21) Appl. No.: 11/584,401

(22) Filed: Oct. 19, 2006

(65) Prior Publication Data

US 2007/0147205 A1 Jun. 28, 2007

(30) Foreign Application Priority Data

Dec. 28, 2005 (JP) ............................. 2005-377830

(51) Int. Cl.
*G11B 7/00* (2006.01)
(52) U.S. Cl. .................. 369/47.53; 369/59.11; 369/116
(58) Field of Classification Search .............. 369/47.53, 369/59.11
See application file for complete search history.

(56) References Cited

U.S. PATENT DOCUMENTS

| | | | | |
|---|---|---|---|---|
| 6,614,735 B2 * | 9/2003 | Shoji et al. | ............... | 369/47.53 |
| 7,002,885 B2 * | 2/2006 | Wang et al. | ............... | 369/47.53 |
| 7,116,410 B2 * | 10/2006 | French et al. | ............... | 356/73.1 |
| 2002/0003760 A1 * | 1/2002 | Honda | ..................... | 369/47.52 |
| 2002/0114232 A1 * | 8/2002 | Seong et al. | ................ | 369/47.4 |
| 2004/0052179 A1 * | 3/2004 | Ishiyama | .................. | 369/47.53 |
| 2005/0117480 A1 * | 6/2005 | Yun | ......................... | 369/47.53 |
| 2006/0209651 A1 * | 9/2006 | Sekiya et al. | ............. | 369/47.53 |

FOREIGN PATENT DOCUMENTS

| | | |
|---|---|---|
| JP | 2003-168216 | 6/2003 |
| JP | 2005-209241 | 8/2005 |

* cited by examiner

*Primary Examiner*—Wayne R Young
*Assistant Examiner*—Linh T Nguyen
(74) *Attorney, Agent, or Firm*—Townsend and Townsend and Crew LLP

(57) ABSTRACT

Within an optical disk recording/reproducing apparatus, equipped with a test writing method during the recording operation, for improving accuracy on calculating the most-suitable power and recording quality, thereby recording data through irradiation of a laser beam of a predetermined power onto a optical disk, defining test writing areas on an inner periphery side and an outer periphery side and an area recordable with data between those inner periphery side and outer periphery side, or reproducing data recorded thereon from a reflection light thereupon, wherein a controller circuit 9 executes a test writing process, with selecting a test writing area on a periphery side being large in a ratio of difference, upon basis of ratios of the differences between powers on an inner periphery and an outer periphery of said disk, which are set up at present, and control data on the inner periphery and the outer periphery, which are recorded on said optical disk loaded therein, when executing the test writing process for determining the predetermined laser power of the laser beam during executing a recording process within the apparatus.

8 Claims, 4 Drawing Sheets

OPTICAL DISK RECORDING/REPRODUCING APPARATUS AND TEST WRITING METHOD THEREOF

BACKGROUND OF THE INVENTION

The present invention relates to a disk recording/reproducing apparatus for recording/reproducing information onto/from an optical disk and a test writing method in such the apparatus, and in particular, it relates to a method for determining a test writing area during the recording process thereof.

An optical disk, being a disc-like optical information recording medium, is widely used, as a medium for enabling accessing to data at high-speed, but without contact thereon, and having a large memory capacity and a low cost thereof, for example, for use of recording/reproducing of audio digital data and digital video data, and further as an external memory device of a computer. On such the optical disk are provided regions or areas, being so-called "test writing area" (PCA), putting so-called a program area, which is usable for a user, between them, i.e., an inner periphery and an outer periphery thereof.

In this manner, because the test writing areas are located on the inner/outer peripheries of the disk, in normal, test writing is executed, basically, on both sides, i.e., the inner/outer peripheries of the disk, when staring the apparatus, etc., for adjusting a power of a laser beam, appropriately, within the optical disk recording apparatus. On the other hand, the test writing mentioned above is also executed, when an error occurs during the recording process, because of reasons of inappropriateness or improperness of power of the laser beam or the like, within the optical disk recording apparatus. However, in such the cases, as was mentioned above, because the test writing areas are provided on both the inner/outer peripheries of the disk, basically, the test writing is executed on both of the inner/outer peripheries; however, the test writing to be executed during the recording process of the apparatus is done, in many cases, only upon one side of the areas, i.e., those provided on the inner periphery or the outer periphery, due to the reasons of time-out (i.e., lowering of transfer rate due to the fact that the process is not executed within a preset time-period, which is determined by OS, etc.) and so on.

For example, in the following Patent Document 1 is already known a recording apparatus and a method for recording data with the most suitable recording power, by conducting the test writing on a selected one, being near from the recording position of data, between those PCAs, which are provided on both the inner periphery and the outer periphery of the program area.

Also, in the following Patent Document 2 is already known an apparatus for conducting the test writing upon any one or on both of the test wiring areas provided on the inner periphery and the outer periphery of the disk, when executing it, i.e., for the purpose of conducting the recording at the most suitable laser power, by taking non-uniformity of physical properties into the consideration, such as, unevenness of pasting of pigment and/or a curvature of the optical disk, etc., of CD-R, for example.

[Patent Document 1] Japanese Patent Laying-Open No. 2005-209241 (2005); and

[Patent Document 2] Japanese Patent Laying-Open No. 2003-168216 (2003).

Thus, as was mentioned in the above, as the method for determining an area to be executed with the test writing, in relation to the conventional arts, the test writing is conducted on the area on the side near to the recording portion, or determination is made on the area to be executed with the test writing by taking a starting portion and an ending position of the recording. However, the test wiring only on one side of the areas, comparing to the test writing conducted on both of the inner/outer peripheries, lowers down the accuracy when obtaining the most suitable power at the position where data is just recorded from now. Also, the laser power obtained through the test writing is not always suitable, and thereafter it is also necessary to execute it depending on the necessity thereof; for that reason, it is important to determine the area (i.e., the inner periphery side or the outer periphery side) where the test writing should be executed, for the purpose of improving the recording quality while suppressing the rotation number down to the minimum.

BRIEF SUMMARY OF THE INVENTION

However, with the determining method of the area to be executed with the test writing, in relation to the conventional arts mentioned above, as will be mentioned later, but in case where an inappropriate power is obtained through the test writing process when starting the apparatus, the processes thereafter are not necessarily sufficient; then, according to the present invention, in particular, an object thereof is to provide a disk recording/reproducing apparatus and a test writing method thereof, for enabling the test writing executed on an appropriate area when conducting it during the recording operation, thereby suppressing the rotation number of execution down to the minimum, preventing the transfer rate from being lowered, and further improving an accuracy of calculating out the most-suitable power and the recording quality.

According to the present invention, for accomplishing the object mentioned above, first of all, there is provided an optical disk recording/reproducing apparatus, for recording data through irradiation of a laser beam of a predetermined power onto a optical disk, defining test writing areas on an inner periphery side and an outer periphery side and an area recordable with data between those inner periphery side and outer periphery side, or reproducing data recorded thereon from a reflection light thereupon, comprising: a pickup comprising a light source for radiating a laser beam to be irradiated upon said optical disk; a driver circuit for controlling a laser power irradiated by said light source of said pickup; and a controller for controlling operation of said apparatus, wherein said controller executes a test writing process, with selecting a test writing area on a periphery side being large in a ratio of difference, upon basis of ratios of the differences between powers on an inner periphery and an outer periphery of said disk, which are set up at present, and control data on the inner periphery and the outer periphery, which are recorded on said optical disk loaded therein, when executing said test writing process for determining the predetermined laser power of said laser beam during executing a recording process within said apparatus.

Also, according to the present invention, within the optical disk recording/reproducing apparatus as is described in the above, it is preferable that said controller of said apparatus obtains setup values of the laser beams on the inner periphery and the outer periphery through executing said test writing process within the test writing areas on the inner periphery side and the outer periphery side of said optical disk, when loading the optical disk therein to start, and has a memory for memorizing therein the setup values of the laser beams on the inner periphery and the outer periphery, which are obtained therethrough, and further that said controller of said apparatus further reads out the control data on the inner periphery and the outer periphery, which are recorded on the optical disk loaded, to be memorized into said memory, when loading the optical disk into said apparatus thereby starting.

Further, according to the present invention, within the optical disk recording/reproducing apparatus as is described in the above, it is preferable that said disk, defining the test writing areas on the inner periphery side and the outer periphery side and the area recordable with data between said inner periphery side and said outer periphery side, is an optical disk of a partial CAV (PCAV) method.

In addition to the above, according to the present invention, also for accomplishing the above-mentioned object, there is also provided a method for test writing for determining a laser beam of a predetermined power, within an optical disk recording/reproducing apparatus, for recording data through irradiation of the laser beam of the predetermined power onto a optical disk, defining test writing areas on an inner periphery side and an outer periphery side and an area recordable with data between those inner periphery side and outer periphery side, or reproducing data recorded thereon from a reflection light thereupon, comprising the following steps: calculating ratios of the differences between powers on an inner periphery and an outer periphery of said disk, which are set up at present, and control data on the inner periphery and the outer periphery, which are recorded on said optical disk loaded into said apparatus; selecting a test writing area on the periphery side being large in the ratio of difference; and executing said test writing selected in the above, thereby executing said test writing process for determining the predetermined laser power of said laser beam during executing a recording process within said apparatus.

Also, according to the present invention, within the method for test writing of the optical disk recording/reproducing apparatus, as described in the above, it is preferable, said test writing is executed within the test writing areas on the inner periphery sided and the outer periphery side of said optical disk, and memorizes setup values of the laser beams on the inner periphery and the outer periphery, which are obtained in the above, and further, further the control data on the inner periphery and the outer periphery, which are recorded on the optical disk loaded therein, are reads out, to be memorized, when the optical disk into said apparatus to start. And, it is also preferable that said ratios of differences are calculated out with using the setup values of the laser beams on the inner periphery and the outer periphery, which are memorized, and the control data on the inner periphery and the outer periphery, which are recorded on the optical disk loaded into said apparatus.

BRIEF DESCRIPTION OF THE SEVERAL VIEWS OF THE DRAWING

Those and other objects, features and advantages of the present invention will become more readily apparent from the following detailed description when taken in conjunction with the accompanying drawings wherein.

DETAILED DESCRIPTION OF THE INVENTION

Hereinafter, embodiments according to the present invention will be fully explained by referring to the attached drawings.

Figure 1:
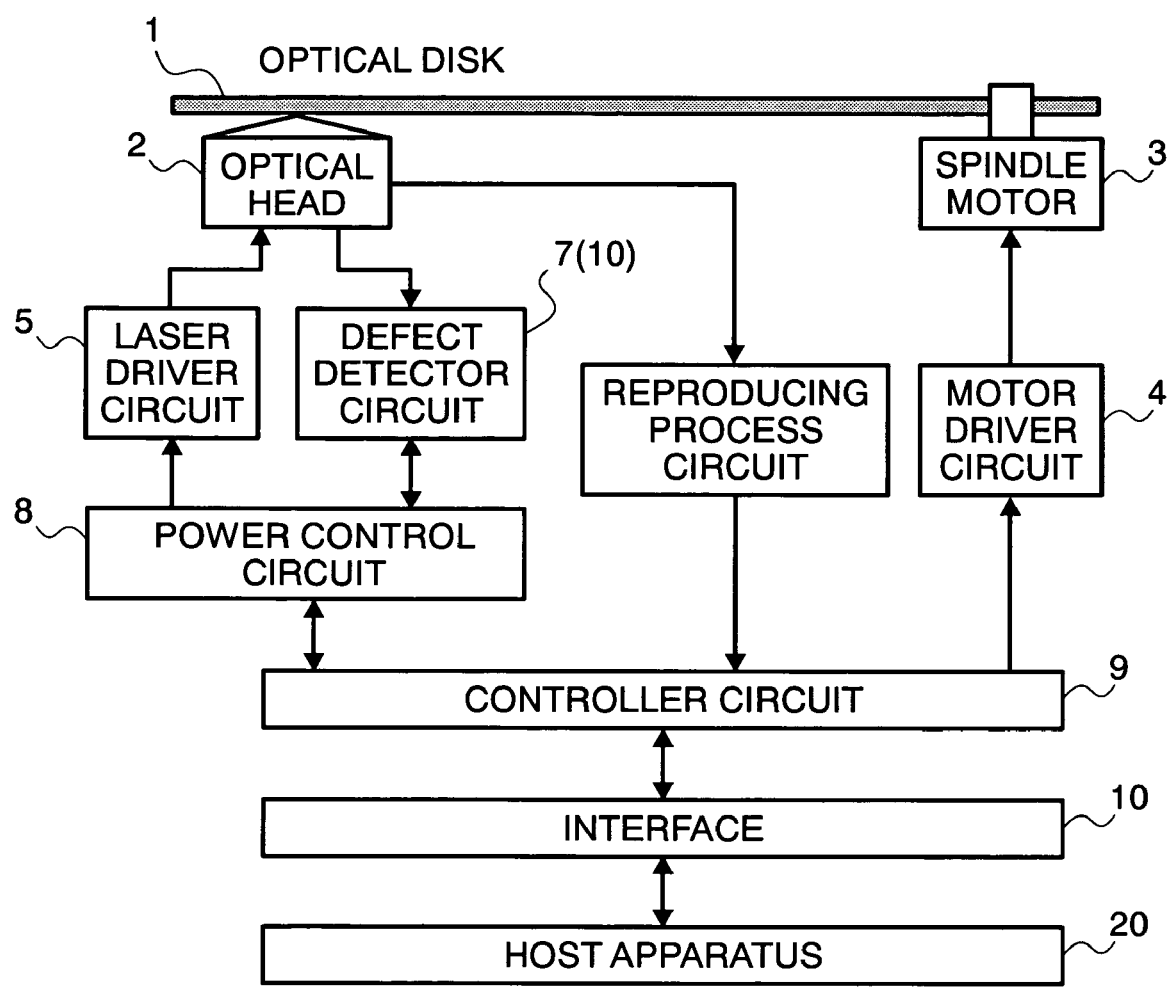
FIG. 1 is a block diagram for showing an outline structure of the optical disk recording/reproducing apparatus, according to an embodiment of the present invention.

FIG. 1 is a block diagram for showing an optical disk recording/reproducing apparatus, according to an embodiment of the present invention. In this figure, an optical disk 1, which can record information on a recording surface thereof, is loaded onto a turntable attached on a rotation shaft of a spindle motor 3, to be rotated at a predetermined speed (i.e., a CAL method or a ZCLV method). Rotation control of this spindle motor 3 is conducted by means of a motor driver circuit 4.

On the other hand, within an optical head 2, a laser beam generated by a semiconductor laser, for example, is irradiated upon the recording surface of the optical disk 1, through an optic system including an objective lens (but not shown in the figure), thereby recording data thereon, or reproducing data recorded thereon through an optical detector (not shown in the figure) for detection a reflection light beam from that optical disk. However, in this optical head 2, a light emission power of the semiconductor laser when recoding is controlled by means of a laser driver circuit 5. Further, this optical head 2 is mounted, being freely movable into the radial direction of the disk, through an actuator not shown in the figure, etc.

A reproducing process circuit 6 in the figure processes data reproduced from the optical disk 1 mentioned above, and a defect detector circuit (or, a signal detector circuit) 7 obtains an envelope of a reproduced signal, thereby detecting the defect on the disk, or the like. And, a power controller circuit 8 generates a test signal to be used when executing the rest writing process (i.e., a recording power variable signal). Further, a controller circuit 9 includes a CPU, for example, and conducts the controlling of the apparatus, as a whole, including the test writing process. And, as is apparent from the figure, this optical disk recording/reproducing apparatus comprises an interface circuit 10, and thereby executing the recording or reproducing process of data, upon an instruction from a host apparatus in an outside of the apparatus (such as, a personal computer, for example).

Next, detailed explanation will be made on a method of test writing during the recording process in the present embodiment, in particular, the method for determining the test writing area, by referring to FIGS. 2(A) and 2(B) and FIG. 3 attached herewith. However, herein as an example thereof, there is shown a method, being so-called a partial CAV (PCAV) method, for example, for a disk on which the test writing areas (PCAs), for use of adjusting the recording power of a laser beam, are provided on both an inner periphery side and an outer periphery side thereof, putting the program area where the user utilizes therebetween, and in particular, applying the CAV method on the inner periphery side and the ZCLV method on the outer periphery side.

Thus, on the disk of this PCA method, an area from the innermost periphery to the position, where the rotation method is exchanged switched over, is controlled by the CAV method of increasing the linear velocity thereof at a constant rate (shown on the vertical axis of the right-hand side in the figure), while an area from that rotation-method switchover position to the outermost periphery is controlled under the ZCLV method. And, with the disk of such PCAV method, normally, in a starting operation when the apparatus is started up by inserting that disk therein, the most-suitable recording laser power (shown on the vertical axis of the left-hand side in the figure) is obtained by using the test writing areas (PCAs), which are provided on the inner periphery side and the outer periphery side, and thereafter, the most-suitable laser power is set up or determined upon basis of that most-suitable recording laser powers, which are obtained on both the inner periphery side and the outer periphery side.

Figure 2A:
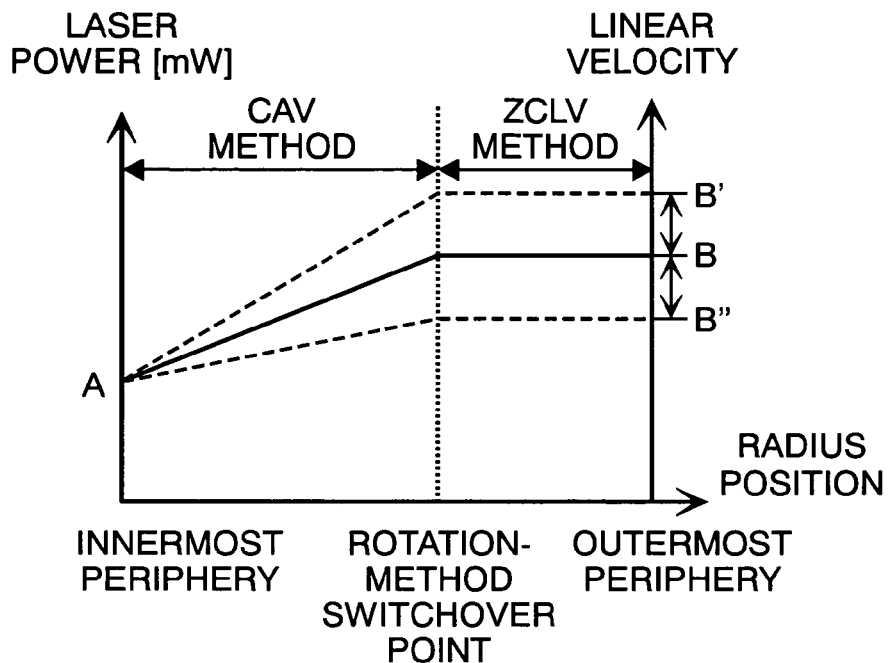
FIGS. 2(A) and 2(B) are view for explaining the principle of rest writing, according to the present invention, to be executed within the optical disk recording/reproducing apparatus mentioned above.

However, firstly, FIG. 2(A) shows a manner of changing on the laser power with respect to the disk radius portion (on the horizontal axis in the figure), in case when obtaining the laser powers, appropriately or properly, in the test writing areas (PCAs) provided on both the inner periphery side and the outer periphery side, to be a power in each of zones, by a bent or broken line A-B' (in case of being large) or A-B" (in case of being small), and a solid broken line A-B, respectively. And, an example of the case, where the laser power obtained in the test writing area (PCA) on the outer periphery side of the disk is inappropriate or improper, it is shown by the dotted broken lines A-B' (in case of being large) or A-B" (in case of being small). And, FIG. 2(B) shows the case where the laser powers obtained in the test writing area on the inner periphery side of the disk is inappropriate or improper, by the dotted broken line A'-B (in case of being small) or A"-B (in case of being large), as well as, the laser power obtained appropriately or properly (the solid broken line A-B).

Figure 3:
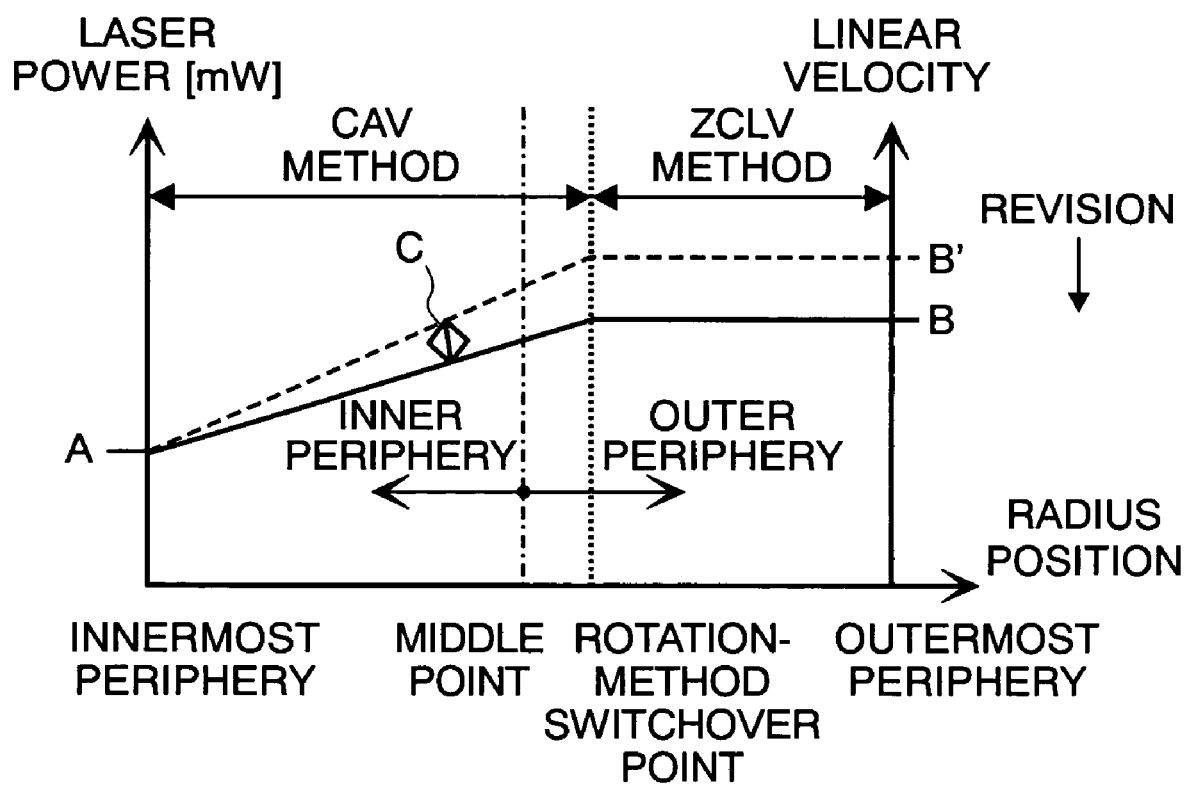
FIG. 3 is a view for explaining the operation of a method for determining the test wiring area, according to the present invention.

Following to the above, FIG. 3 attached herewith shows a manner of changing of the laser power with respect to the disk position (on the horizontal axis in the figure), in particular, in the case where, although obtaining the laser power appropriately or properly on the inner periphery side, but inappropriately or improperly in the test writing area (PCA) provided on the outer periphery side, as was shown in FIG. 2(A), in more details, to be a large value B' larger than an actual appropriate or proper value B, by the dotted line (however, the change is shown by the solid line when being appropriate or proper). As a result thereof, in case when any error occurs during the recording process at a position shown by "C" in the figure, i.e., on the inner periphery side of the program area (i.e., locating on the side of the innermost periphery than a middle or intermediate point in the figure), then the test writing should be executed; however, in that case, according to the conventional arts mentioned above, the test writing is conducted in the test wiring area (PCA) provided in the inner periphery side, irrespective of inappropriateness or improperness of the setup on the outer periphery side. For that reason, with this, there is no chance that the inappropriate or improper setup is corrected, even if conducting the test writing how often.

Thus, in FIG. 3 mentioned above, assuming that "C" point is a call position of test writing, since the present position is located near to the inner periphery, then according to the conventional art, the test writing is executed in the area on the inner periphery side. However, as is apparent from this figure, since the position where the power comes off is on the outer periphery side, it is necessary to execute the test writing on the outer periphery. Hereinafter, explanation will be given on a method for dissolving such the drawback, according to an embodiment of the present invention. However, in the process of test writing, the power of the laser beam is set up or determined after setting out a necessary speed, and thereafter writing the test writing data onto the test writing area (PCA). Following to that, the test writing data is read out, so as to detect parameters indicating characteristics of the recording and/or reproducing, such as, an error rate and a jitter amount of the data reproduced, amplitude of the signal, etc., for example. Thereafter, with using the parameters indicating that recording and/or reproducing characteristics, determination is made on whether the power of laser beam is suitable or not for conducting the recording.

Figure 4A:
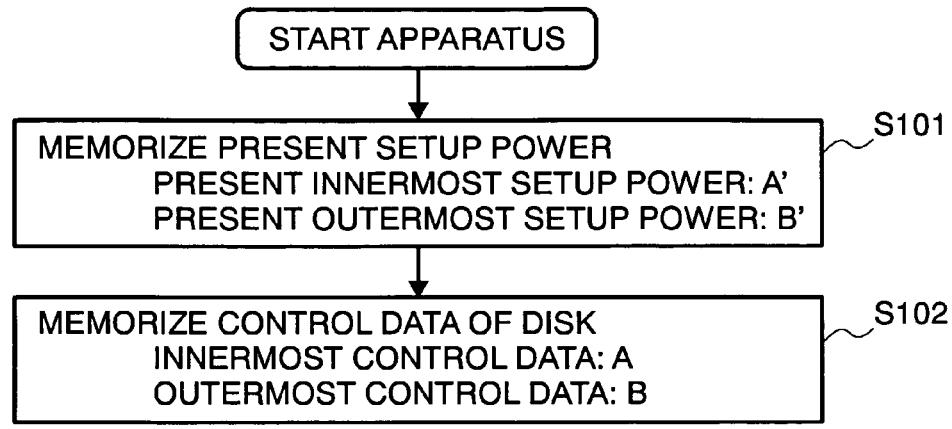
FIGS. 4(A) and 4(B) are flowcharts for explaining the details of the method for determining the test wiring area, according to the present invention.

Within the present embodiment, being achieved by taking the drawbacks of the conventional arts mentioned above into the consideration, in more details thereof, as is shown in FIG. 4(A) attached herewith, when the optical disk 1 is loaded into the optical disk recording/reproducing apparatus, first of all, into the memory thereof, for example, are memorized values of the laser powers (i.e., the present innermost setup power: A', and the present outermost setup power: B'), which are obtained through conducting the test writing process within the test writing area (PCA) provided on the inner periphery side and the outer periphery side of that optical disk 1 (S101). However, at the same time, the reference powers, to be references for the powers on the inner/outer peripheries among the control data, are also memorized into the memory, in the similar manner (S102). Those processes are executed by means of the CPU, etc., building up the controller circuit 9 within the optical disk recording/reproducing apparatus shown in FIG. 1 mentioned above. Further, such the processes as was mention above are repeated when the test writing process is executed, again, thereafter, and thereby memorizing the newest setup powers and control data therein, always.

Figure 4B:
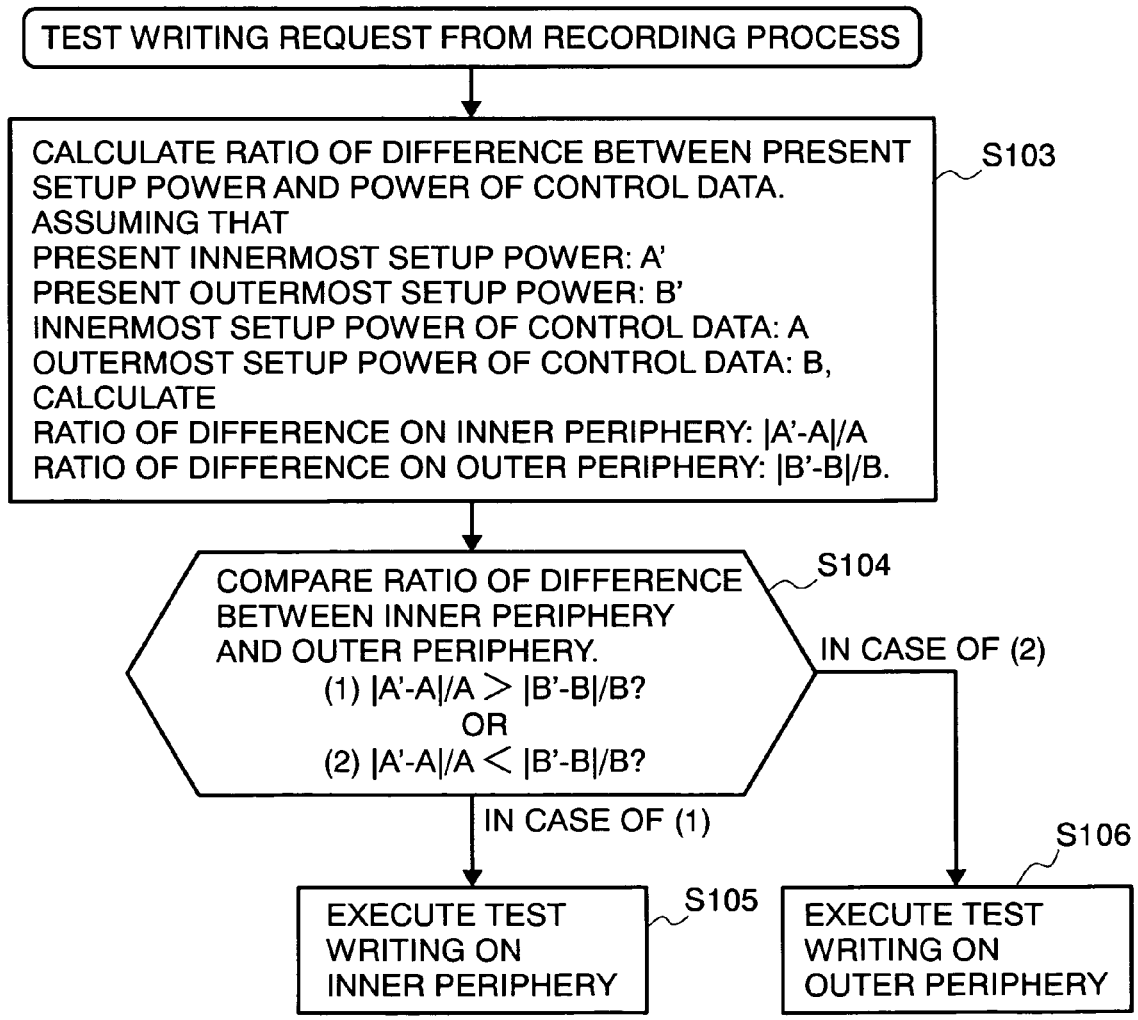

Thereafter, as is shown in the flow of processes for determining the area to be executed with the test writing, from the recording process, in FIG. 4(B) attached herewith, when a request for the test writing is generated due to any reason from the recording process of data, for example, with using the following equations are obtained the powers on the inner/outer peripheries, which are set up at present, and differences thereof from the reference powers on the inner/outer peripheries of the control data, which are written on the disk, respectively, and the ratios (or, rates) of the differences to the reference powers on the inner/outer peripheries are calculated out, on both the inner/outer peripheries (S103). This is because; there is a case that the laser power is inappropriate or improper on the inner periphery side, or the laser power is inappropriate or improper on the outer periphery side, when such the test writing request is issued, as is shown in FIGS. 2(A) and 2(B) mentioned above.

Ratio of difference on inner periphery: $|A'-A|/A$

Ratio of difference on outer periphery: $|B'-B|/B$

Following to the above, upon a result obtained in the process S103 mentioned above, determination is made that the area on the side, being large in the ratio (or, rate) thereof, to the area where the test writing should be executed (S104). Thus, determination is made on necessity of re-execution of the test writing on either one of the inner/outer peripheries, by calculating out the ratio of difference between the preset setup power and the power of the control data. Thus, in case when determining that $|A'-A|/A > |B'-B|/B$, corresponding to FIG. 2(B) mentioned above, the test writing area on the inner periphery side of the disk is selected to be the area where the test writing should be executed, and the test writing is executed with in the test writing area on that inner periphery side (S105). On the other hand, when determining that $|B'-B|/B > |A'-A|/A$, then corresponding to FIG. 2(A) mentioned above, the test writing area on the outer periphery side of the disk is selected to be the area where the test writing should be executed, and the test writing is executed within the test writing area on that outer periphery side (S106).

With such the method for determining the test writing area during the recording process as was mentioned above, for example, as was mentioned in FIG. 3 above, not conducting the conventional test writing method, i.e., not conducting the test writing on the side (e.g., the inner periphery side or the outer periphery side) near to the position where the writing is conducted on the disk radius (i.e., the test writing is executed within the area on the inner periphery side, in the example shown in FIG. 3); however, the area where the test writing should be conducted is selected upon basis of the ratio (or, the rate) of the differences between the present setup powers on the inner/outer peripheries and the reference powers of the control data for the inner/outer peripheries, with respect to the reference powers, in other words, the side, on which the difference is large between the power, which is actually set up, and the power to be the reference, and therefore being high in a possibility the power comes off from the appropriate or proper value thereof. Thus, in the example shown in FIG. 3 mentioned above, as is shown by a arrow "revision" on the right-hand side, the area on the outer periphery side, the actual power of which comes off from the appropriate or proper value thereof, is selected to be the area to be executed with the test writing. On the other hand, in case of that shown in FIG. 2(B) mentioned above, since the ratio (or, the rate) on the inner periphery side where the actual power comes off from the appropriate or proper value, shows the large value, therefore the area in the inner periphery side is selected to be the area where the test wiring should be conducted.

With doing this, it is possible to revise or correct the laser power, which is obtained previously, for example, when starting, and shown by the dotted broken or bent line A-B', into the solid broken or bent line A-B, with certainty, with lesser number of times of execution, and thereby enabling to increase the accuracy of calculating the most-suitable power and the recording quality, as well as, preventing the transfer rate from being lowered down. Thus, according to the present embodiment, determining the area where the test writing should be executed, upon the powers, which are set up at present, but irrespective of the position thereof, it is possible to execute the test writing within the area where the test writing seems to be necessary to be done, and thereby enabling to obtain the laser power suitable at that recording position. With this, an improvement on the recording quality can be prospected.

Although, in case where it is necessary to execute the test writing due to generation of an error or the like, during the recording, the test writing is executed on the side that seems to be the most-suitable, according to the embodiment of the present invention mentioned above; however, in spite of that, if the error is remaining still not dissolved, then the test writing is executed on the opposite side. In more details, when "error occurs" is generated upon receipt of a "Write" instruction, "Write retry" is executed, "power incorrect: CALL test writing" is conducted, and then "execute test wiring" is carried out. Thereafter, the "Write retry" is executed, and if there is still generated the "error occurs", the "power incorrect: CALL test writing" is executed, but at that instance, after doing "execute test writing on the side opposite previous one", then conduct the retry.

Figure 2B:
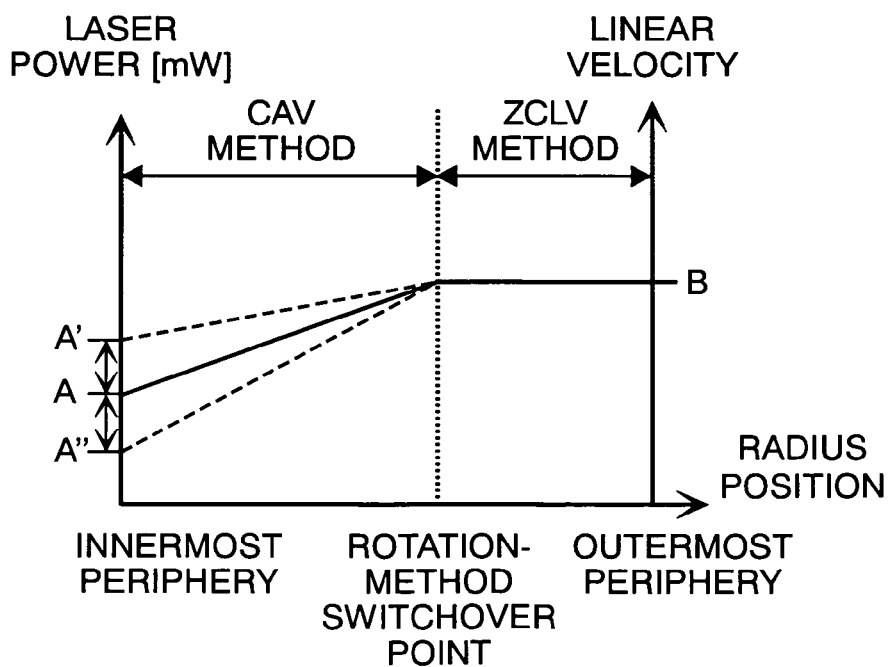

In the explanation given in the above, as was shown in FIGS. 2(A) and 2(B) and FIG. 3 mentioned above, as being the optical disk, onto which the method for determining the test writing area, according to the present embodiment, is applied, mentioning was made, in particular, only upon the disk of the so-called partial CAV (PCAV) method, forming or defining the program area of the CAV method on the inner periphery side while the program area of the ZCLV method on the outer periphery side, between the test writing areas (PCAs) defined on both the inner periphery side and the outer periphery side thereof; however, the present embodiment should not be restricted only to that mentioned above, but it is apparent for the person skilled in the art that the disk may be one of forming or defining the program area of only the CAV method or of only the ZCLV method on the outer periphery side, but without providing the rotation-method switch over position, provided on both the inner periphery side and the outer periphery side thereof.

As was fully mentioned above, according to the present invention, with determination of the area to be executed with the test writing depending upon the powers set up at present, but irrespective of the position on the disk, contrary to the conventional arts, it is possible to conduct the test writing in the area where the test wiring seems to be needed, and therefore, there can be obtained an effect, being superior in a practical viewpoint, of obtaining an appropriate or suitable laser power at the recording position, and thereby obtaining an improvement on the recording quality.

The present invention may be embodied in other specific forms without departing from the spirit or essential feature or characteristics thereof. The present embodiment(s) is/are therefore to be considered in all respects as illustrative and not restrictive, the scope of the invention being indicated by the appended claims rather than by the forgoing description and range of equivalency of the claims are therefore to be embraces therein.

What is claimed is:

1. An optical disk recording/reproducing apparatus, for recording data through irradiation of a laser beam of a predetermined power onto a optical disk, defining test writing areas on an inner periphery side and an outer periphery side and an area recordable with data between those inner periphery side and outer periphery side, or reproducing data recorded thereon from a reflection light thereupon, comprising:
   a pickup comprising a light source for radiating a laser beam to be irradiated upon said optical disk;
   a driver circuit for controlling a laser power irradiated by said light source of said pickup; and
   a controller for controlling operation of said apparatus, wherein said controller executes a test writing process, with selecting a test writing area on a periphery side being large in a ratio of difference, upon basis of ratio of the differences between powers on an inner periphery of said disk, which is set up at present, and control data on the inner periphery, which is recorded on said optical disk loaded therein, and upon basis of ratio of the difference between powers on an outer periphery, which is set up at present, and control data on the outer periphery, which is recorded on said optical disk loaded therein, when executing said test writing process for determining the predetermined laser power of said laser beam during executing a recording process within said apparatus.

2. The optical disk recording/reproducing apparatus, as is described in the claim 1, wherein said controller of said apparatus obtains setup values of the laser beams on the inner periphery and the outer periphery through executing said test writing process within the test writing areas on the inner periphery side and the outer periphery side of said optical disk, when loading the optical disk therein to start, and has a memory for memorizing therein the setup values of the laser beams on the inner periphery and the outer periphery, which are obtained therethrough.

3. The optical disk recording/reproducing apparatus, as is described in the claim 2, wherein said controller of said apparatus further reads out the control data on the inner periphery and the outer periphery, which are recorded on the optical disk loaded, to be memorized into said memory, when loading the optical disk into said apparatus thereby starting.

4. The optical disk recording/reproducing apparatus, as is described in the claim 1, wherein said disk, defining the test writing areas on the inner periphery side and the outer periphery side and the area recordable with data between said inner periphery side and said outer periphery side, is an optical disk of a partial CAV (PCAV) method.

5. A method for test writing for determining a laser beam of a predetermined power, within an optical disk recording/reproducing apparatus, for recording data through irradiation of the laser beam of the predetermined power onto a optical disk, defining test writing areas on an inner periphery side and an outer periphery side and an area recordable with data between those inner periphery side and outer periphery side, or reproducing data recorded thereon from a reflection light thereupon, comprising the following steps:

calculating a first ratio of the differences between powers on an inner periphery, which is set up at present, and control data on the inner periphery, which is recorded on said optical disk loaded into said apparatus;

calculating a second ratio of the differences between powers on an outer periphery, which is set up at present, and control data on the outer periphery, which is recorded on said optical disk loaded into said apparatus;

selecting a test writing area on the periphery side being large in the ratio of difference between the first ratio and the second ratio; and executing said test writing selected in the above, thereby executing said test writing process for determining the predetermined laser power of said laser beam during executing a recording process within said apparatus.

6. The method for test writing of the optical disk recording/reproducing apparatus, as described in the claim 5, wherein said test writing is executed within the test writing areas on the inner periphery side and the outer periphery side of said optical disk, and memorizes setup values of the laser beams on the inner periphery and the outer periphery, which are obtained in the above.

7. The method for test writing of the optical disk recording/reproducing apparatus, as described in the claim 6, wherein further the control data on the inner periphery and the outer periphery, which are recorded on the optical disk loaded therein, are reads out, to be memorized, when the optical disk into said apparatus to start.

8. The method for test writing of the optical disk recording/reproducing apparatus, as described in the claim 7, wherein said first ratio and said second ratio is calculated out with using the setup values of the laser beams on the inner periphery and the outer periphery, respectively, which are memorized, and the control data on the inner periphery and the outer periphery, which are recorded on the optical disk loaded into said apparatus.

* * * * *